(12) United States Patent
Ito et al.

(10) Patent No.: US 6,873,111 B2
(45) Date of Patent: Mar. 29, 2005

(54) VEHICULAR LAMP

(75) Inventors: Masayasu Ito, Shizuoka-ken (JP); Hitoshi Takeda, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 1 day.

(21) Appl. No.: 10/677,707

(22) Filed: Oct. 2, 2003

(65) Prior Publication Data

US 2004/0066143 A1 Apr. 8, 2004

(30) Foreign Application Priority Data

Oct. 8, 2002 (JP) ........................................ 2002-295484

(51) Int. Cl.[7] .............................................. B60Q 1/02
(52) U.S. Cl. ........................ 315/82; 315/77; 315/291; 315/273; 340/468; 362/545
(58) Field of Search ............................... 315/77, 80, 82, 315/291, 164, 273, 312, 320; 340/464, 468, 469; 307/38, 112, 113, 115; 362/276, 543, 545

(56) References Cited

U.S. PATENT DOCUMENTS

| | | | | |
|---|---|---|---|---|
| 3,594,720 A | * | 7/1971 | Cane | 340/925 |
| 5,281,949 A | * | 1/1994 | Durley et al. | 340/433 |
| 5,838,259 A | * | 11/1998 | Tonkin | 340/903 |
| 2004/0061450 A1 | * | 4/2004 | Ito et al. | 315/160 |

FOREIGN PATENT DOCUMENTS

| | | |
|---|---|---|
| JP | 61-48836 | 4/1986 |
| JP | 2001-215913 | 8/2001 |

OTHER PUBLICATIONS

Patent Abstracts of Japan Publication No. JP2001215913, Publication date Aug. 10, 2001, 1 page.

* cited by examiner

Primary Examiner—Haissa Philogene
(74) Attorney, Agent, or Firm—Osha & May L.L.P.

(57) ABSTRACT

A vehicular lamp used in a vehicle, includes: a light source for emitting light in accordance with a voltage given thereto; a light-source controlling transistor for controlling power supplied to the light source by repeatedly switching whether or not the power is supplied to the light source; a capacitor having one end grounded and another end at which a potential is changed like a saw-tooth by charging and discharging of the capacitor; a capacitor controlling transistor for controlling a timing at which the charging and discharging of the capacitor is switched; and a comparator for comparing the potential at the other end of the capacitor to a reference voltage given thereto and controlling a timing at which the light-source controlling transistor is turned on or off and a timing at which the capacitor controlling transistor is turned on or off in synchronization with each other based on the comparison result.

5 Claims, 4 Drawing Sheets

VEHICULAR LAMP

This patent application claims priority from a Japanese patent application No. 2002-295484 filed on Oct. 8, 2002, the contents of which are incorporated herein by reference.

BACKGROUND OF THE INVENTION

1. Field of the Invention

The present invention relates generally to a vehicular lamp for use in a vehicle.

2. Description of the Related Art

Conventionally, a lamp such as a taillight and a stop lamp, is used in a vehicle such as an automobile. In the lamp are provided a light source connected in series with a power supply, and a resistor, connected in series between the light source and power supply, for defining a current to be supplied to the light source. Moreover, a plurality of light sources may be provided in parallel in order to emit light having sufficient light amount. In this case, for each light source, a resistor for defining a current to be supplied to the light source is provided as disclosed, for example, in Japanese Patent Application Laid-Open No. 2001-215913, page 4 and FIG. 8.

In addition, the lamp serves as a plurality of types of lamp that are different in the amount of emitted light, such as the taillight and stop lamp. Thus, resistors having different resistance values are provided for the respective light sources and it is switched which resistor is used for supplying a current to the corresponding light source, thereby switching the amount of the emitted light of the light source as disclosed in Japanese Utility-Model Publication No. 61-48836, page 1, for example.

However, the conventional lamp requires a plurality of resistors for the respective light sources as described above and it is also necessary to provide wirings for connecting the resistors and the power source and the associated light sources, respectively. Thus, the fabrication cost increases. Moreover, in a case where the number of the light sources connected in parallel is increased, it is necessary to increase the resistors and wirings that respectively correspond to the light sources, too. This leads to further increase of the fabrication cost.

In addition, it is necessary to form a lighting circuit for lighting a light source unit in accordance with the number of light sources connected in parallel in the light source unit including a plurality of light sources. That is, when the number of parallel light sources in the light source unit is changed, a different lighting circuit should be used. Thus, the lighting circuit has low versatility.

SUMMARY OF THE INVENTION

Therefore, it is an object of the present invention to provide a vehicular lamp, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a vehicular lamp used in a vehicle, comprises: a light source operable to emit light in accordance with a voltage given thereto; a light-source controlling transistor operable to control power supplied to the light source by repeatedly switching whether or not the power is supplied to the light source; a capacitor having one end grounded and another end at which a potential is changed like a saw-tooth by charging and discharging of the capacitor; a capacitor controlling transistor operable to control a timing at which the charging and discharging of the capacitor is switched; and a comparator operable to compare the potential at the other end of the capacitor to a reference voltage given thereto and to control a timing at which the light-source controlling transistor is turned on or off and a timing at which the capacitor controlling transistor is turned on or off in synchronization based on a result of comparison.

The light-source controlling transistor and the capacitor controlling transistor may be MOS transistors or transistors having base resistors, a gate terminal of the light-source controlling transistor and a gate terminal of the capacitor controlling transistor, or the base resistors of the light-source controlling transistor and the capacitor controlling transistor may be electrically connected, a source terminal of the light-source controlling transistor and a source terminal of the capacitor controlling transistor may be electrically connected, and the capacitor controlling transistor may allow a drain current smaller than that of the light-source controlling transistor to flow.

The comparator may include: a comparison transistor operable to receive the potential at the other end of the capacitor at its base terminal, receive the reference potential at its emitter terminal and control the timing at which the light-source controlling transistor is turned on or off and the timing at which the capacitor controlling transistor is turned on or off based on whether or not a potential difference between the potential at the other end of the capacitor and the reference potential is larger than a predetermined threshold; a reference-value transistor, electrically connected to a collector terminal of the comparison transistor at its base terminal, operable to supply the reference potential to the emitter terminal of the comparison transistor, the reference potential being different between a state where the comparison transistor is on and a state where the comparison transistor is off; a first reference resistor having one end to which a predetermined application voltage is applied and another end electrically connected to the collector terminal of the comparison transistor; and a second reference resistor having one end to which the predetermined application voltage is applied and another end electrically connected to a collector terminal of the reference-value transistor, the gate terminal or base resistor of the light-source controlling transistor and the gate terminal or base resistor of the capacitor controlling transistor, the reference resistor having a smaller resistance value than that of the first reference resistor.

The vehicular lamp may serve as a taillight of the vehicle and a stop lamp that emits brighter light than the taillight, and may further comprise a mode switching unit operable to switch a taillight mode in which the light-source controlling transistor is made to control the power supplied to the light source to make the vehicular lamp serve as the taillight and a stop lamp mode in which the light-source controlling transistor is not allowed to control the power supplied to the light source to make the vehicular lamp serve as the stop lamp, and the mode switching unit may apply a discharge-suppressing voltage to the other end of the capacitor to suppress the discharging of the capacitor in the stop lamp mode, to keep the light-source controlling transistor on.

The mode switching unit may supply a supplied voltage in accordance with an input voltage given thereto to the light source, and the mode switching unit may further include a protection circuit operable to make the capacitor generate a saw-tooth wave to control the power supplied to the light source, when the mode switching unit received the input voltage higher than the predetermined voltage in the stop lamp mode.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 2A shows an example when a power supply 200 generates a voltage of 13 V as a power-supply voltage; and FIG. 2B shows an example when the power supply 200 generates a voltage of 18 V as the power-supply voltage.

FIG. 4A shows an example when the power supply 200 generates a voltage of 13 V as a standard power-supply voltage; and FIG. 4B shows an example when the power supply 200 generates a voltage of 18 V as the standard power-supply voltage.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
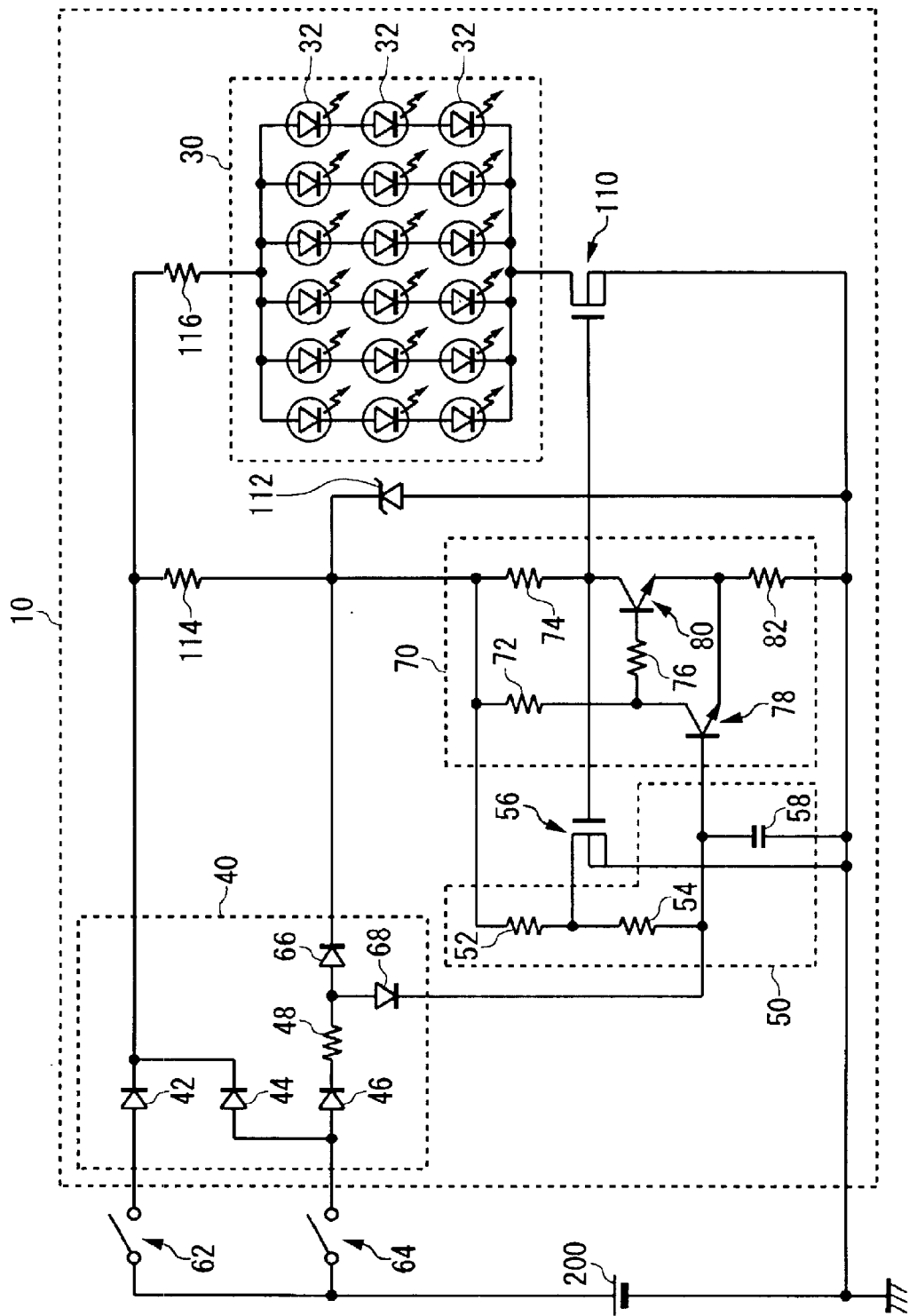
FIG. 1 shows an exemplary structure of a vehicular lamp 10 according to the present invention.

FIG. 1 shows an exemplary structure of a vehicular lamp 10 according to an embodiment of the present invention. The vehicular lamp 10 serves as a taillight of a car or the like, and a stop lamp that emits light brighter than the taillight. First, an operation of the vehicular lamp 10 is generally described. The vehicular lamp 10 includes a mode switching unit 40, a saw-tooth wave generation unit 50, a comparison unit 70, a light source unit 30, a circuit resistor 114, a light-source resistor 116, a Zener diode 112, a capacitor controlling transistor 56 and a light-source controlling transistor 110.

The light source unit 30 includes a plurality of light sources 32 and emits light in accordance with power given thereto. A plurality of light sources 32 may be provided in series or in parallel. In this example, the light source 32 is a light-emitting diode.

The vehicular lamp 10 is connected to an external power supply 200 via switches 62 and 64. The switches 62 and 64 are provided between an external power supply 200 and the light source unit 30 and switch whether or not the vehicular lamp 10 is operated as the taillight or stop lamp. In this description, the external power supply 200 is a battery mounted on a vehicle. In a case where the vehicular lamp 10 serves as the taillight, the switch 62 is turned on and the switch 64 is turned off. In a case where the vehicular lamp 10 servers as the stop lamp, the switch 64 is turned on. For example, the switch 62 may be a lamp switch provided on the driver's side in the vehicle for lighting the taillight, while the switch 64 may be a brake switch working with a brake pedal of the vehicle.

The light-source controlling transistor 110 controls power to be supplied to the light source unit 30 by repeatedly switching whether or not the power is supplied to the light source unit 30. In this example, the light-source controlling transistor 110 is a MOS transistor provided between the light source unit 30 and ground potential in series, and switches whether or not the power is supplied to the light source unit 30 by switching whether or not a current is allowed to flow from the light source unit 30 to the ground potential based on a voltage applied to a gate terminal of the light-source controlling transistor 100.

The saw-tooth wave generation unit 50 generates a saw-tooth wave for controlling whether the light-source controlling transistor 110 is turned on or off. The saw-tooth wave generation unit 50 includes a capacitor 58 having one end that is grounded and the other end at which a potential is changed like a saw-tooth by charging and discharging of the capacitor 58, so as to generate the saw-tooth wave by the potential at the other end of the capacitor 58. The saw-tooth wave generation unit 50 includes a charging resistor 52, a charging/discharging resistor 54 and the capacitor 58.

The capacitor controlling transistor 56 controls a timing at which the charging and discharging of the capacitor 58 is switched. Moreover, in this example, the capacitor controlling transistor 56 is a MOS transistor having a gate terminal electrically connected to a gate terminal of the light-source controlling transistor 110. Thus, the capacitor controlling transistor 56 and the light-source controlling transistor 110 are turned on and off in synchronization with each other. The capacitor controlling transistor 56 allows a drain current smaller than that of the light-source controlling transistor 110 to flow therein.

The light-source controlling transistor 110 and the capacitor controlling transistor 56 may be bipolar transistors having base resistors. In this case, the base resistors of the transistors 110 and 56 are electrically connected. Moreover, the light-source controlling transistor 110 and the capacitor controlling transistor 56 further include resistors each electrically connecting a base terminal and an emitter terminal of the corresponding transistor electrically. Also in this structure, the vehicular lamp 10 performs a similar operation to that in a case of using the MOS transistor.

The comparison unit 70 compares the potential at the other end of the capacitor 58 to a reference potential given to the comparison unit 70 so as co control the timing at which the light-source controlling transistor 110 and the capacitor controlling transistor 56 are turned on or off in synchronization with each other based on the comparison result. In other words, the comparison unit 70 supplies a potential based on the comparison result to the gate terminals of the light-source controlling transistor 110 and the capacitor controlling transistor 56. The comparison unit 70 includes the first reference resistor 72, the second reference resistor 74, a base resistor 76, a common resistor 82, a comparison transistor 78 and a reference-value transistor 80.

The mode switching unit 40 switches a taillight mode in which the vehicular lamp 10 serves as the taillight and a stop-lamp mode in which the vehicular lamp 10 serves as the stop lamp based on which one of the switches 62 and 64 is on. The mode switching unit 40 makes the light-source controlling transistor 110 control the power to be supplied from the power supply 200 to the light source unit 30 in a case where the vehicular lamp 10 is operated as the taillight, but does not allow the light-source controlling transistor 110 to control the power to be supplied from the power supply 200 to the light source unit 30. The mode switching unit 40 includes a plurality of diodes 42, 44, 46, 66 and 68 and a resistor 48.

Next, operations of respective components in a case where the vehicular lamp 10 is operated as the taillight, that is, a case where the switch 62 is on and the switch 64 is off, are described. The diode 42 receives a power-supply voltage generated by the power supply 200 via the switch 62 and supplies it to the light source unit 30 via the light-source resistor 116. The diode 42 also applies that power-supply voltage to the circuit resistor 114 provided in parallel to the light source unit 30.

The circuit resistor 114 is connected between the comparison unit 70 and saw-tooth wave generation unit 50 and the diode 42 in series. The Zener diode 112 is connected between the circuit resistor 114 and the ground potential in the reverse direction so as to be arranged in parallel to the comparison unit 70 and saw-tooth wave generation unit 50. That is, to the comparison unit 70 and saw-tooth wave generation unit 50, a voltage defined by the Zener diode 112 is applied from the power supply 200 via the circuit resistor 114. In this manner, the comparison unit 70 and saw-tooth wave generation unit 50 can be operated irrespective of change of the power-supply voltage. That is, a threshold voltage of the Zener diode 112 in the reverse direction is lower than the power-supply voltage generated by the power supply 200.

The charging/discharging resistor 54 of the saw-tooth wave generation unit 50 is connected to the other end of the capacitor 58 in series, while the charging resistor 52 is connected between the charging/discharging resistor 54 and the circuit resistor 114 in series. Moreover, a point between the charging resistor 52 and the charging/discharging resistor 54 is connected to a drain terminal of the capacitor controlling transistor 56. In a case where the capacitor controlling transistor 56 is off, the capacitor 58 is charged by the power-supply voltage via the circuit resistor 114, the charging resistor 52 and the charging/discharging resistor 54. Moreover, a source terminal of the capacitor controlling transistor 56 is connected to the ground potential and therefore the capacitor 58 is discharged via the charging/discharging resistor 54 and the capacitor controlling transistor 58 in a case where the capacitor controlling transistor 58 is on.

The comparison transistor 78 of the comparison unit 70 receives the potential at the other end of the capacitor 58 at its base terminal and a reference voltage at its emitter terminal, and controls the timing at which the light-source controlling transistor 110 and the capacitor controlling transistor 56 are turned on or off based on whether or not the potential difference between the potential at the other end of the capacitor 58 and the reference voltage is larger than a predetermined threshold. That is, the comparison transistor 78 switches turning-on and turning-off of the reference-value transistor 80 by going on or off so as to cause a collector potential of the reference-value transistor 80 to be changed, thereby controlling the timing at which the light-source controlling transistor 110 and the capacitor controlling transistor 56 are turned on or off.

A collector terminal of the comparison transistor 78 is connected to the circuit resistor 114 via the first reference resistor 72, while an emitter terminal thereof is connected to the ground potential via the common resistor 82. The first reference resistor 72 has one end to which a predetermined application voltage is applied and the other end electrically connected to the emitter terminal of the comparison transistor 78. Please note that the predetermined application voltage is a voltage defined by the Zener diode 112.

The comparison transistor 78 is turned on in a case where the potential difference between the potential at one end of the capacitor 58 that has been charged and the reference voltage applied to the emitter terminal exceeds a threshold of the comparison transistor 78, thereby allowing a current from the power supply 200 to flow to the ground potential via the circuit resistor 114, the first reference resistor 72 and the common resistor 82. In this case, a base potential of the reference-value transistor 80 becomes lower and therefore the reference-value transistor 80 is turned off. In this description, the reference potential supplied to the comparison transistor 78 is a potential at a connection point of the common resistor 82 and the emitter terminal of the comparison transistor 78.

The reference-value transistor 80 supplies a reference potential to the emitter terminal of the comparison transistor 78 the collector terminal of which is electrically connected to the base terminal of the reference-value transistor 80. That is, different potential value is supplied to the comparison transistor 78 in a state where the transistor 78 is on from where it is in off state.

The reference-value transistor 80 is connected to the circuit resistor 114 via the second reference resistor 74 at its collector terminal and is connected to the ground potential via the common resistor 82 at its emitter terminal. In the second reference resistor 74, a predetermined application voltage is given to one end while the other end is electrically connected to the collector terminal of the reference-value transistor 80, the gate terminal of the light-source controlling transistor 110 and the gate terminal of the capacitor controlling transistor 56. The second reference resistor 74 has a smaller resistance value than the first reference resistor 72.

When the reference-value transistor 80 was turned off, this causes no current to flow from the second reference resistor 74 to the common resistor 82, thereby a potential between the second reference resistor 74 and the collector terminal of the reference-value transistor 80 goes up. Thus, the capacitor controlling transistor 56 and the light-source controlling transistor 110 are turned on so as to supply power to the light source unit 30.

When the capacitor controlling transistor 56 has been turned on, the capacitor 58 is discharged as described above. In a case where the potential difference between the potential at the other end of the capacitor 58 and the reference potential is smaller than the threshold of the comparison transistor 78, the comparison transistor 78 is turned off. In this case, the reference-value transistor 80 is turned on and the light-source controlling transistor 110 and capacitor controlling transistor 56 are turned off, because the collector potential of the comparison transistor 78 increases. By repeating the above operation, it is possible to perform chopper control for the power to be supplied to the light source unit 30 so as to reduce that power, thereby reducing the amount of light emission of the light source unit 30.

The reference potential given to the comparison transistor 78 is determined by a dividing ratio by which by the first reference resistor 72 and the common resistor 82 divides the voltage defined by the Zener diode 112 in a case where the comparison transistor 78 is on, while being determined by a dividing ratio by which the second reference resistor 74 and the common resistor 82 divides the voltage defined by the Zener diode 112 in a case where the comparison transistor 78 is off. Since the resistance value of the second reference resistor 74 is smaller than that of the first reference resistor 72, the reference voltage given in the case where the comparison transistor 78 is on is lower than that given in the case where the comparison transistor 78 is off. That is, the reference potential in a case where the capacitor 58 has been discharged is lower than that in a case where the capacitor 58 has been charged. Thus, the saw-tooth wave generation unit 50 can generate a saw-tooth wave where the charging and discharging are switched at a predetermined timing. In other words, the vehicular lamp 10 can turn on and off the light source unit 30 at a predetermined duty ratio.

Next, operations of the respective components in a case where the vehicular lamp serves as the stop lamp, that is, a case where the switch 64 is on are described. The diode 44 receives the power-supply voltage generated by the power supply 200 and supplies it to the light source unit 30 via the light-source resistor 116.

The diode 46 receives the power-supply voltage generated by the power supply 200 via the switch 64 and applies a discharge-suppressing voltage based on the power-supply voltage to the other end of the capacitor 58 via the resistor 48 and the diode 68. That is, the diode 68 applies the discharge-suppressing voltage to the other end of the capacitor 58 so as to suppress the discharge of the capacitor 58, thereby stopping the generation of the saw-tooth wave in the saw-tooth wave generation unit 50. Even when the capacitor 58 has been charged and the capacitor controlling transistor 56 has been turned on, the capacitor 58 is not discharged because the discharge-suppressing voltage is always applied to the capacitor 58. Thus, it is possible to keep the light-source controlling transistor 110 on. By keeping the light-source controlling transistor 100 on, the power having the duty ratio of 100% is supplied to the light source unit 30, and therefore the light source unit 30 emits light brighter than in a case where the vehicular lamp 10 serves as the taillight. Moreover, the diode 66 is provided in order to prevent a voltage at the connection point between the resistor 48 and the diode 68 from going up to the voltage defined by the Zener diode 112 or higher in a case where an excess voltage such as load dump surge is applied to the vehicular lamp 10. Thus, it is possible to prevent breakdown of the components such as the capacitor 58, by voltage.

According to the vehicular lamp 10 in this example, it is possible to operate the vehicular lamp 10 as two types of lamp that are different in brightness of emitted light, i.e., the taillight and stop lamp by simple circuit structure. For example, it is possible to reduce the number of the resistors connected in series with the light source unit 30. Moreover, it is possible to generate the saw-tooth wave by simple circuit structure and perform chopper control by controlling the gate terminals of the transistor for generating the saw-tooth wave and the transistor for controlling the light source in common. Furthermore, according to the vehicular lamp 10 in this example, irrespective of the number of the light sources 32 connected in parallel in the light source unit 30, it is possible to light the light source unit 30 by a common lighting circuit, thus providing the improved versatility.

Figure 2A:
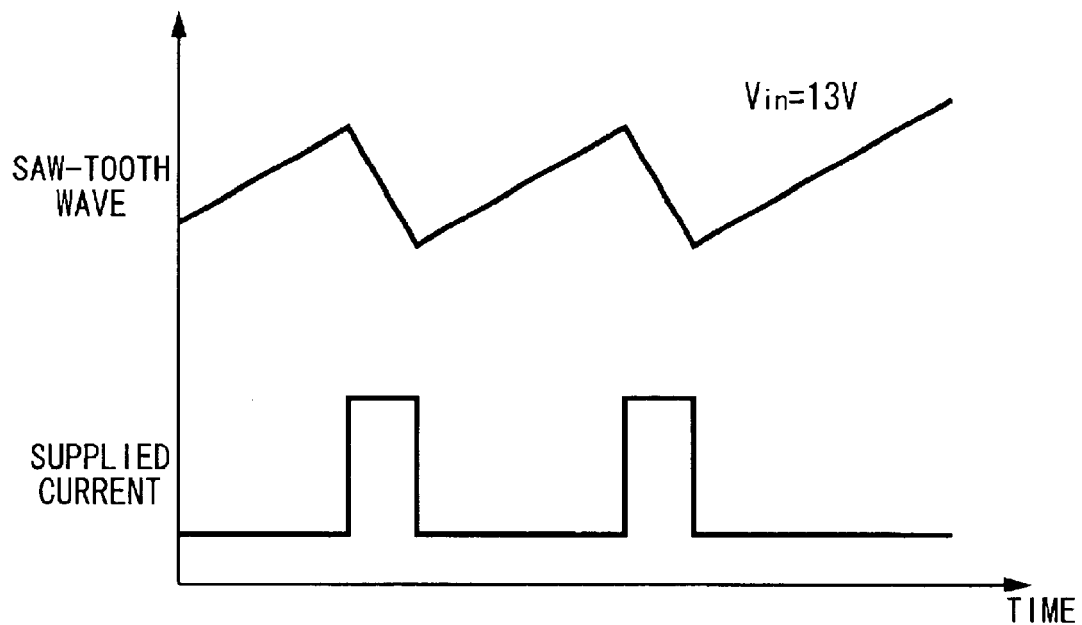
FIGS. 2A and 2B show exemplary operations of the vehicular lamp 10 described referring to FIG. 1 in a case where the vehicular lamp 10 serves as a taillight.
Figure 2B:
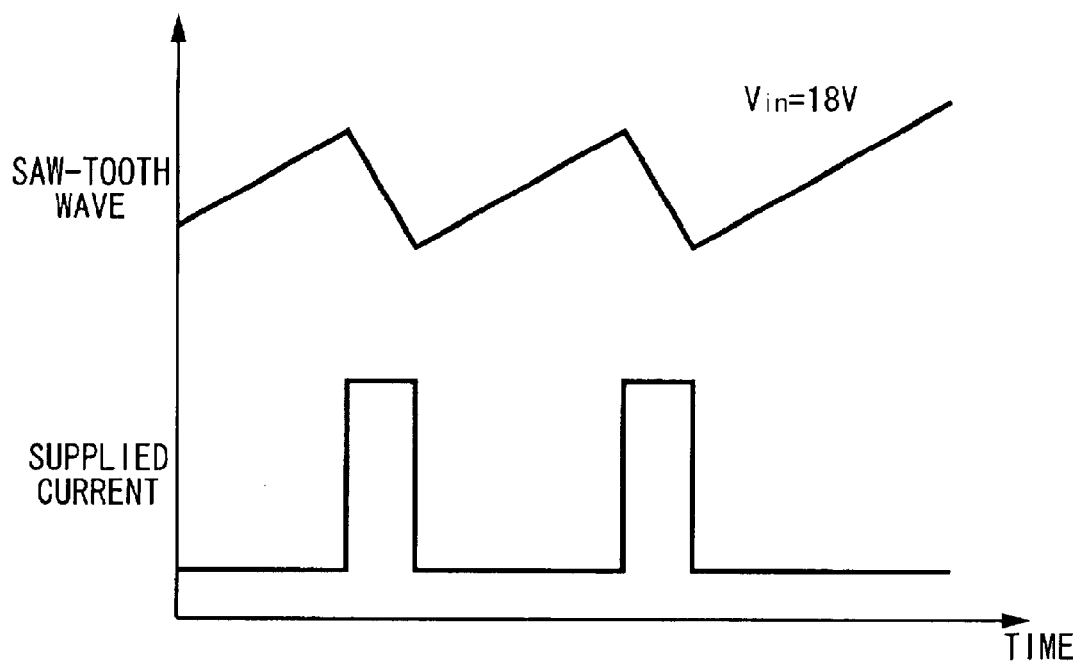

FIG. 2A and FIG. 2B show exemplary operations in a case where the vehicular lamp 10 described referring to FIG. 1 serves as the taillight. FIG. 2A shows an exemplary operation when the power supply 200 generates a voltage of 13 V as the power-supply voltage.

As described above, the light-source controlling transistor 110 is off during a period in which the capacitor 58 is charged, and the supplied current to the light source unit 30 is approximately zero. On the other hand, the light-source controlling transistor 110 is on during a period in which the capacitor 58 is discharged, and the supplied current in accordance with the power-supply voltage is supplied to the light source unit 30.

FIG. 2B shows an exemplary operation when the power supply 200 generates a voltage of 18 V as the power-supply voltage. Also in this example, the supplied current to the light source unit 30 is approximately zero during the period in which the capacitor 58 is charged, whereas the supplied current in accordance with the power-supply voltage is supplied to the light source unit 30 during the period in which the capacitor 58 is discharged. In this example, the supplied current increases because the power-supply voltage supplied is higher than that in the example shown in FIG. 2A. Moreover, as shown in FIGS. 2A and 2B, the duty ratio of the supplied current is not changed by the power-supply voltage. That is, when the power-supply voltage increases, the supplied current also increases.

Figure 3:
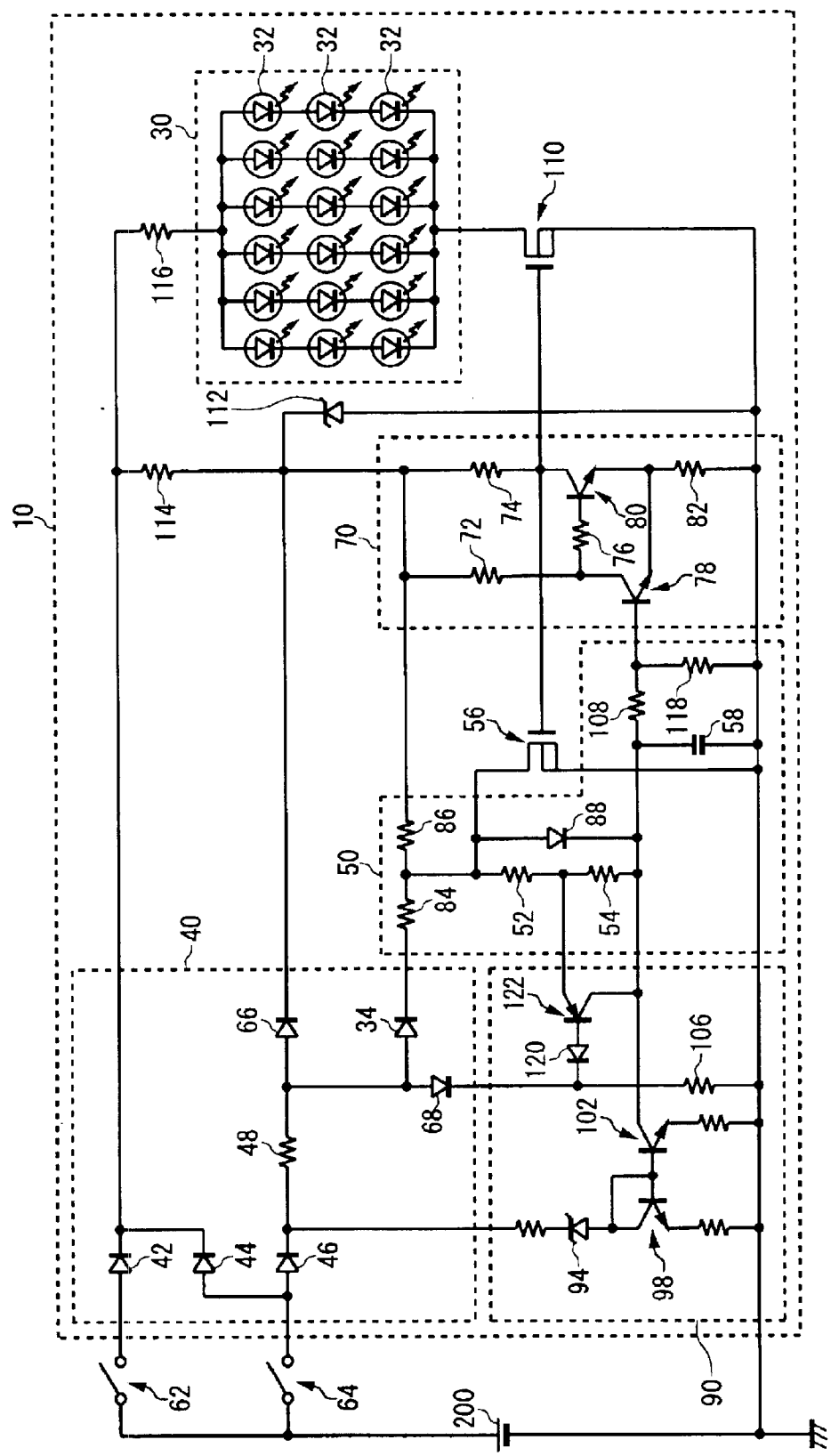
FIG. 3 shows another exemplary structure of the vehicular lamp 10 according to the present invention.

FIG. 3 shows another exemplary structure of the vehicular lamp 10. In FIG. 3, the components labeled with the same reference numerals as those in FIG. 1 have the same or similar functions and structures as/to those described referring to FIG. 1.

In a case where the vehicular lamp 10 serves as the taillight, the vehicular lamp 10 supplies power for which chopper control has been performed to the light source unit 30, by a similar operation to that in the example of FIG. 1. In this example, the saw-tooth wave generation unit 50 further includes: a resistor 86 connected between the resistor 114 and the charging resistor 52 in series; a diode 88 provided between the resistor 86 and the capacitor 58 so as to be in parallel to the charging resistor 52 and the charging/discharging resistor 54; a resistor 108 provided between the capacitor 58 and the gate terminal of the comparison transistor 78; and a resistor 118 provided between a point between the resistor 108 and the gate terminal of the comparison transistor 78 and the ground potential so as to be in parallel to the capacitor 58. The capacitor 58 is charged via the resistor 86 and the diode 88. To the gate terminal of the comparison transistor 78, a voltage obtained by dividing the charged voltage of the capacitor 58 by the resistors 108 and 118.

The capacitor 58 is discharged via a transistor 122 described later, the charging resistor 52 and the capacitor controlling transistor 56. The capacitor controlling transistor 56 and the light-source controlling transistor 110 repeatedly go on and off in accordance with the charged voltage of the capacitor 58, like the vehicular lamp 10 described referring to FIG. 1, thereby supplying the power at a predetermined duty ratio to the light source unit 30. Moreover, since the amount of discharge of the capacitor 58 is reduced via the resistors 108 and 118, the resistors 108 and 118 have larger resistance values than that of the charging resistor 52.

In a case where the vehicular lamp 10 serves as the stop lamp, the capacitor 58 is charged via the resistor 48, the diode 34, the resistor 84 and the diode 88. The diode 34 and the resistor 84 are provided between the resistor 48 and the charging resistor 52 in series. In a case where the capacitor 58 has been charged and the capacitor controlling transistor 56 has been turned on, the current supplied to the capacitor 58 is bypassed to the ground potential via the capacitor controlling transistor 56. Therefore, the capacitor 58 is discharged via the charging/discharging resistor 54, the charging resistor 52 and the capacitor controlling transistor 56, so that the power for which chopper control has been performed is supplied to the light source unit 30, as in the case of the taillight.

Please note that the power having the larger duty ratio can be supplied to the light source unit 30 by making the sum of the resistance values of the charging resistor 52 and the charging/discharging resistor 54 larger than the resistance value of the resistor 84. In this example, by setting the sum of the resistance values of the charging resistor 52 and the charging/discharging resistor 54 to a value about 20–40 times the resistance value of the resistor 84, the power having the duty ratio of approximately 100% can be supplied to the light source unit 30. Moreover, in order to reduce the duty ratio in a case of the taillight, it is preferable that the resistance value of the charging resistor 52 be smaller than that of the charging/discharging resistor 54.

The vehicular lamp 10 in this example includes a protection circuit 90 in addition to the structure of the vehicular lam 10 described referring to FIG. 1. As described above, the mode switching unit 40 receives the power-supply voltage generated by the power supply 200 as its input and supplies a supplied voltage in accordance with the input voltage to the light source unit 30. In the stop lamp mode of the vehicular lamp 10 where the vehicular lamp 10 serves as the stop lamp, the protection circuit 90 makes the capacitor 58 generate a saw-tooth wave having a shorter discharge time in a case where the mode switching unit 40 received the input voltage higher than a predetermined voltage, thereby controlling the power to be supplied to the light source unit 30. In this example, the protection circuit 90 can make the capacitor 58 generate the saw-tooth wave having the shorter discharge time by increasing the discharge rate of the capacitor 58.

The protection circuit 90 includes a Zener diode 94, a transistor 98, a transistor 102 and a transistor 122. The Zener diode 94 is connected at its cathode to a cathode of the diode 46. The transistor 98 is connected to an anode of the Zener diode 94 at collector and base terminals thereof, while being connected to the ground potential via a resistor at an emitter terminal thereof. The transistor 98 is turned on in a case where the input voltage higher than a threshold voltage of the Zener diode 94 in the reverse direction is applied to the Zener diode 94 via the diode 46, so that a current in accordance with the input voltage flows from the power supply 200 to the ground potential via the resistors 92 and 96.

The transistor 102 is provided to form a mirror circuit with respect to the transistor 98 and allows a current in accordance with an emitter current of the transistor 98 to flow to the ground potential. A collector terminal of the transistor 102 is connected to the other end of the capacitor 58 and therefore the capacitor 58 is discharged in accordance with the current flowing in the mirror circuit. Thus, the discharge rate of the capacitor 58 increases and the power to be supplied to the light source unit 30 is reduced. Moreover, the capacitor 58 is discharged at a rate in accordance with the current in the mirror circuit, that is, the input voltage. In other words, the capacitor 58 is discharged more rapidly when the input voltage is higher, thus further reducing the power to be supplied to the light source unit 30.

The resistor 106 of the protection circuit 90 is provided between the resistor 48 and the ground potential to be in parallel to the resistor 84, the charging resistor 52, the charging/discharging resistor 54 and the capacitor 58. The resistor 106 is connected to the resistor 48 via the diode 68 for preventing a reverse current. A base terminal of the transistor 122 is connected between the diode 68 and the resistor 106 via the diode 120. An emitter terminal of the transistor 122 is connected between the charging resistor 52 and the charging/discharging resistor 54, while a collector terminal thereof is connected to the collector terminal of the transistor 102 and the other end of the capacitor 58.

In a case where the vehicular lamp 10 serves as the taillight, no current flows through the resistor 106. Thus, the transistor 122 is turned on. In a case where the vehicular lamp 10 serves as the stop lamp, a current flows in the resistor 106 and therefore the transistor 122 is turned off. In this manner, it is possible to make a path of the discharge of the capacitor 58 different between the taillight mode and the stop lamp mode of the vehicular lamp 10 as described above, thus changing the discharge rate.

According to the vehicular lamp 10 in this example, in a case where a large input voltage is given, the power to be supplied to the light source unit 30 can be reduced so as to protect the light source unit 30. Moreover, since the power to be supplied to the light source unit 30 can be limited, the resistance value of the light-source resistor 116 for defining the current to be supplied to the light source unit 30 can be made smaller. Thus, the amount of heat generated in the light-source resistor 116 and it is therefore possible to allow the vehicular lamp 10 to operate precisely.

Figure 4A:
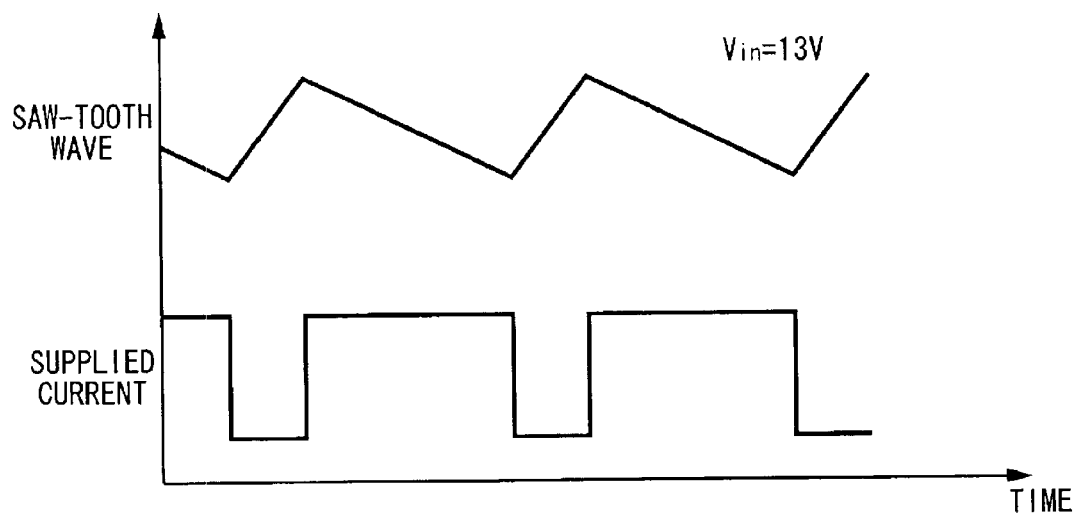
FIGS. 4A and 4B show exemplary operations of the vehicular lamp 10 described referring to FIG. 3 in a case where the vehicular lamp 10 serves as a stop lamp.
Figure 4B:
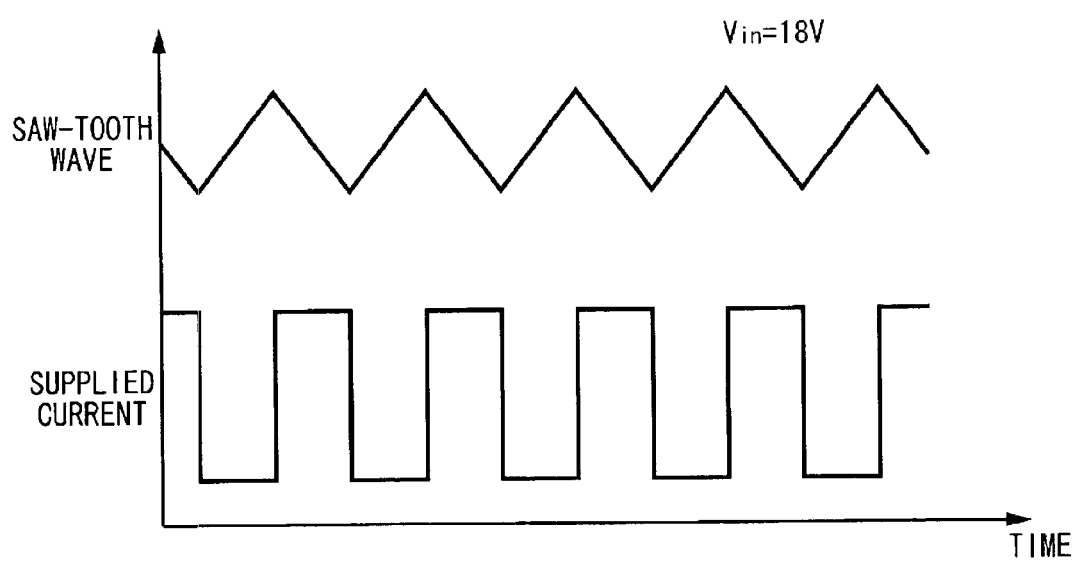

FIGS. 4A and 4B show examples of the operation of the vehicular lamp 10 described referring to FIG. 3 in a case where the vehicular lamp 10 operates as the stop lamp. The operation of the vehicular lamp 10 in a case of the taillight is similar to that described referring to FIGS. 2A and 2B. FIG. 4A shows an exemplary operation of the vehicular lamp 10 in a case of the stop lamp when the power supply 200 generates a voltage of 13 V as a standard power-supply voltage. In this case, the vehicular lamp 10 supplies the power having the duty ratio of approximately 100% to the light source unit 30.

FIG. 4B shows an exemplary operation when the power supply 200 generates a voltage of 18 V as the power-supply voltage. When the power-supply voltage becomes higher, the maximum value of the supplied current increases. However, since the duty ratio of the supplied current is reduced as described above, the power consumed by the light source unit 30 can be kept approximately constant. In other words, according to the vehicular lamp 10 in this example, the power consumption can be kept approximately constant for various power supplies. Since the vehicular lamp 10 in this example can be used for various power supplies, it is excellent in versatility.

As is apparent from the above, according to the present invention, a vehicular lamp can be provided that can operate as two types of lamp that are different in brightness, such as a taillight and a stop lamp, by simple circuit structure.

Although the present invention has been described by way of exemplary embodiments, it should be understood that those skilled in the art might make many changes and substitutions without departing from the spirit and the scope of the present invention which is defined only by the appended claims.

What is claimed is:

1. A vehicular lamp used in a vehicle, comprising:
   a light source operable to emit light in accordance with a voltage given thereto;
   a light-source controlling transistor operable to control power supplied to said light source by repeatedly switching whether or not said power is supplied to said light source;

a capacitor having one end grounded and another end at which a potential is changed like a saw-tooth by charging and discharging of said capacitor;

a capacitor controlling transistor operable to control a timing at which said charging and discharging of said capacitor is switched; and a comparator operable to compare said potential at said another end of said capacitor to a reference voltage given thereto and to control a timing at which said light-source controlling transistor is turned on or off and a timing at which said capacitor controlling transistor is turned on or off in synchronization based on a result of comparison.

2. A vehicular lamp as claimed in claim 1, wherein said light-source controlling transistor and said capacitor controlling transistor are MOS transistors or transistors having base resistors, a gate terminal of said light-source controlling transistor and a gate terminal of said capacitor controlling transistor, or said base resistors of said light-source controlling transistor and said capacitor controlling transistor are electrically connected, a source terminal of said light-source controlling transistor and a source terminal of said capacitor controlling transistor are electrically connected, and said capacitor controlling transistor allows a drain current smaller than that of said light-source controlling transistor to flow.

3. A vehicular lamp as claimed in claim 2, wherein said comparator includes:

a comparison transistor operable to receive said potential at said another end of said capacitor at its base terminal, receive said reference potential at its emitter terminal and control said timing at which said light-source controlling transistor is turned on or off and said timing at which said capacitor controlling transistor is turned on or off based on whether or not a potential difference between said potential at said another end of said capacitor and said reference potential is larger than a predetermined threshold;

a reference-value transistor, electrically connected to a collector terminal of said comparison transistor at its base terminal, operable to supply said reference potential to said emitter terminal of said comparison transistor, said reference potential being different between a state where said comparison transistor is on and a state where said comparison transistor is off;

a first reference resistor having one end to which a predetermined application voltage is applied and another end electrically connected to said collector terminal of said comparison transistor; and a second reference resistor having one end to which said predetermined application voltage is applied and another end electrically connected to a collector terminal of said reference-value transistor, said gate terminal or base resistor of said light-source controlling transistor and said gate terminal or base resistor of said capacitor controlling transistor, said reference resistor having a smaller resistance value than that of said first reference resistor.

4. A vehicular lamp as claimed in claim 3, wherein said vehicular lamp serves as a taillight of said vehicle and a stop lamp that emits brighter light than said taillight, and further comprise a mode switching unit operable to switch a taillight mode in which said light-source controlling transistor is made to control said power supplied to said light source to make said vehicular lamp serve as said taillight and a stop lamp mode in which said light-source controlling transistor is not allowed to control said power supplied to said light source to make said vehicular lamp serve as said stop lamp, and said mode switching unit applies a discharge-suppressing voltage to said another end of said capacitor to suppress said discharging of said capacitor in said stop lamp mode, to keep said light-source controlling transistor on.

5. A vehicular lamp as claimed in claim 4, wherein said mode switching unit supplies a supplied voltage in accordance with an input voltage given thereto to said light source, and said mode switching unit further includes a protection circuit operable to make said capacitor generate a saw-tooth wave to control said power supplied to said light source, when said mode switching unit received said input voltage higher than said predetermined voltage in said stop lamp mode.

* * * * *